United States Patent [19]

Ingram et al.

[11] Patent Number: 4,702,352
[45] Date of Patent: Oct. 27, 1987

[54] AUTOMATIC ADJUSTER

[75] Inventors: Brian Ingram, Gloucestershire; Hugh G. Margetts, Herefordshire; Michael J. England, Gwent, all of Great Britain

[73] Assignee: Lucas Industries Public Limited Co., Birmingham, England

[21] Appl. No.: 841,764

[22] Filed: Mar. 20, 1986

[30] Foreign Application Priority Data

Mar. 21, 1985 [GB] United Kingdom ................. 8507299

[51] Int. Cl.⁴ ............................................. F16D 51/50
[52] U.S. Cl. ............................. 188/79.5 GE; 188/329
[58] Field of Search ............... 188/78, 79.5 R, 79.5 P, 188/79.5 GE, 79.5 GC, 79.5 GT, 79.5 SC, 79.5 S, 196 BA, 196 V, 196 D, 329, 330; 192/111 A

[56] References Cited

U.S. PATENT DOCUMENTS 3,882,974  5/1975  Hill .......................... 188/79.5 GE X
4,380,277  4/1983  Ingram et al. ........... 188/196 BA X
4,530,424  7/1985  Fukuzawa et al. ..... 188/79.5 GE X

FOREIGN PATENT DOCUMENTS 1419254  12/1975  United Kingdom .

Primary Examiner—Andres Kashnikow
Assistant Examiner—Robert J. Oberleitner
Attorney, Agent, or Firm—Holman & Stern

[57] ABSTRACT

An automatic adjuster includes a two part strut interconnected by a non-reversible thread so that extension of the strut under the influence of an adjuster device is effected by relative rotation between the two parts. The adjuster device includes a spigot, rotation of which is controlled by a clutch member as a result of a cooperation between helical teeth respectively on the strut part and spigot and also uni-directionally couples the spigot to a fixed member so that in the event of temporary clutch disengagement due to vibration, rotation of the spigot in the de-adjusting direction is prevented by rotation thereof is the adjusting direction is permitted when required.

15 Claims, 10 Drawing Figures

AUTOMATIC ADJUSTER

This invention relates to an automatic adjuster, primarily for a vehicle brake, operable to maintain a substantially constant clearance between the braking surfaces respectively of a braking element and a rotatable braking member of the brake, the adjuster being of the kind comprising a strut having two parts between which there is a non-reversible screw threaded connection permitting the effective length of the strut to be increased by relative rotation between the parts under the influence of an adjuster device which incorporates clutch means for controlling said relative rotation in response to the occurrence of excessive clearance between said surfaces.

One form of adjuster of this kind is illustrated in our earlier British Patent No. 1419254 applied to a shoe drum brake, and incorporates a clutch member which is urged by resilient means into engagement with a clutch face so as normally to prevent rotation of an adjuster member. Whilst this arrangement operates quite satisfactorily under most conditions there can be a tendency, under heavy vibration for example, for the clutching force to be overcome temporarily, permitting the adjuster member to rotate to a de-adjusted position, giving rise to suddenly increased pedal movement upon brake actuation, and consequent adverse driver reaction.

An object of the present invention is to provide an automatic adjuster in which the aforesaid tendency to random de-adjustment is minimised or avoided.

According to the invention, an automatic adjuster comprises a strut having two parts between which there is a non-reversible screw threaded connection permitting the effective length of the strut to be increased by relative rotation between the parts under the influence of an adjuster device which incorporates clutch means for controlling said relative rotation in response to the occurrence of excessive clearance between braking surfaces, one of the adjuster parts being coupled by uni-directional means to a relatively fixed part of the adjuster to resist rotation of said one adjuster part in a de-adjusting direction but to permit rotation thereof in the adjusting direction.

Preferably, resilient means which urges the clutch into engagement acts also to urge the uni-directional means towards an operative condition.

In one convenient arrangement, said uni-directional means comprises two parts independently movable axially but keyed against relative rotation, one of which parts is non-rotatably engaged with said one adjuster part and the other of which is releasably uni-directionally coupled to said relatively fixed part.

Said uni-directional means preferably includes a pawl engagable with a ratchet on said relatively fixed part. Conveniently, the ratchet may be of annular form and the uni-directional means may have angularly spaced arms, each carrying a pawl for engagement with the ratchet.

The invention will now be described, by way of example, with reference to the accompanying drawings in which.

Figure 1:
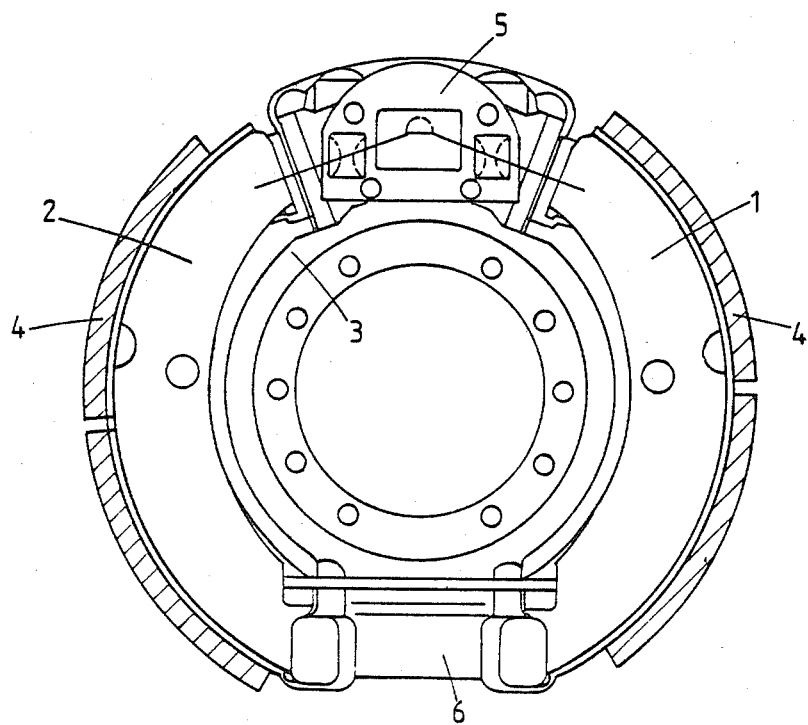
FIG. 1 is an elevation of part of a vehicle internal shoe drum brake with the drum removed.

Referring to FIG. 1, the shoe drum brake illustrated therein has a pair of arcuate shoes 1 and 2 mounted on a backplate 3, each shoe having a friction lining 4 for braking engagement with a rotatable drum (not shown). The brake is of the leading/trailing type, having a cam actuator 5 mounted on the backplate 3 between one pair of adjacent shoe ends and an abutment device 6 also mounted on the backplate and disposed between the other pair of adjacent shoe ends, in conventional manner.

Figure 2:
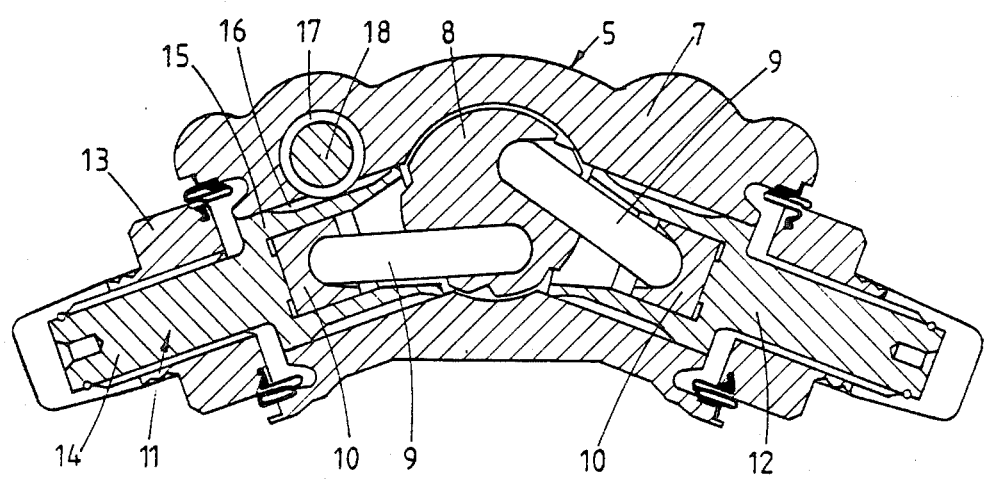
FIG. 2 is a view in longitudinal cross section of an actuator embodied in the brake of FIG. 1.

The actuator 5 is illustrated in more detail in FIG. 2 and will be seen to comprise a housing 7 adapted to be fixed in conventional manner to the backplate 3 and within which is mounted a rotary cam 8 which co-operates via struts 9 and inserts 10 with respective tappets indicated generally at 11, 12 the inserts being press-fitted within the tappets. Each tappet 11, 12 incorporates an automatic adjuster mechanism, each of which includes an internally threaded nut 13 through which extends a correspondingly threaded spigot 14 projecting from a head portion 15 of the tappet, the nut and spigot together constituting a strut of variable length operable to alter the retracted position of the adjacent brake shoe in response to wear of the shoe friction lining. The adjacent shoe contacts the nut 13 and thereby prevents rotation of the nut which, however, may move axially along the spigot 14 by rotation of the latter. The external surface of the head 15 is formed with helical gear teeth 16 which mesh with similar teeth 17 on an end portion of an adjuster member in the form of a spigot 18 mounted in the housing for rotation about an axis at right angles to that of the tappet 11.

Figure 3:
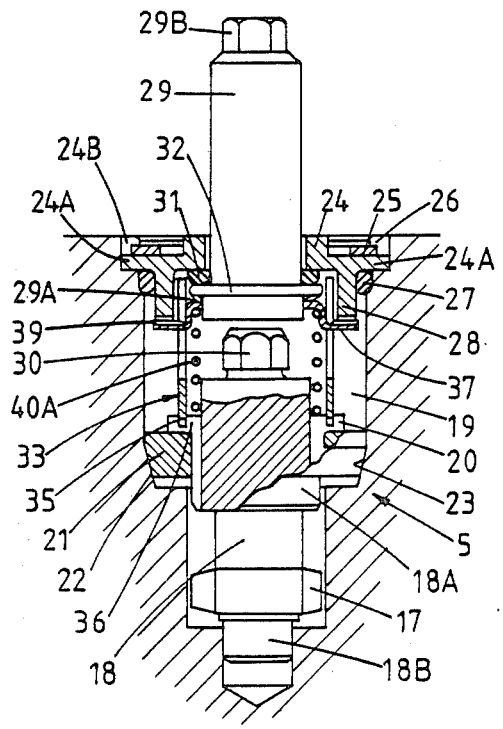
FIG. 3 is a fragmentary view, partly in cross-section, of part of an automatic adjuster of the invention incorporated in the brake of FIG. 1.
Figure 4:
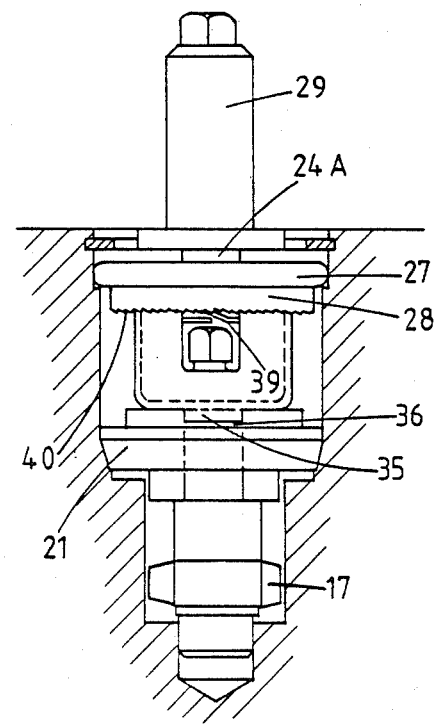
FIG. 4 is a side elevation of the adjuster of FIG. 3 rotated through 90° relative to FIG. 3, only the surrounding body being in cross-section.

The adjuster member and its associated mechanism is illustrated in more detail in FIGS. 3 and 4. The spigot 18 is mounted in a bore 19 of the housing which is stepped to receive various parts of the adjuster member and its associated mechanism which have different diameters. The spigot 18 is journalled for rotation in the bore by means respectively of larger and smaller diameter axially spaced portions 18A and 18B of the spigot. The helical teeth 17 are provided around the spigot adjacent the portion 18B and mesh with the teeth 16 of the head 15, as described above. The larger diameter portion 18A of the spigot terminates in a radial flange 20 and a clutch member 21 is pressed on to the portion 18A into abutment with the flange 20 in such a manner as to be rotatable with the spigot 18. Typically, the portion 18A is knurled so as to ensure keying of the clutch member to the spigot. The clutch member 21 is provided with a conical clutch face 22 which normally co-operates with a corresponding conical clutch surface 23 formed on the internal wall of the housing.

The upper end of the bore 19 is closed by an end member 24 retained in position by a circlip 25 lodged under a shoulder 26 of the housing, and held against rotation by suitable means shown as a pair of opposed lugs 24A engaged in recesses 24B of the housing, although more or less than two could be used, as required. A seal 27 is interposed between the outer wall of an annular boss 28 of the end member and the inner wall of the bore to prevent ingress of foreign material. A manual adjuster spindle 29 is rotatably mounted in the end member and slidable longitudinally so that a hexagonal or similar formation 30 on the upper end of the adjuster member 18 may be engaged by a complementary recess in the inner end of the shaft 29 to enable manual adjustment of the adjuster to be effected by rotation of the shaft. Sealing between the shaft 29 and end member 24 is performed by a seal 31 interposed between an end surface of the end member and a rib 32 on the shaft.

In some conventional adjusters of this kind, in which operation of an adjuster member is dependent upon the frictional clutching action of a spring-urged clutch member, it has been found possible under extreme conditions for vibrational forces to overcome the force of the spring urging the clutch member against its clutch seat, resulting in the occurrence of unwanted random de-adjusting movements of the adjuster member. In order to prevent this happening, the adjuster of the invention is provided with a uni-directional coupling means, indicated generally at 33 which acts to prevent rotation of the spigot 18 in the de-adjusting direction.

Figure 5:
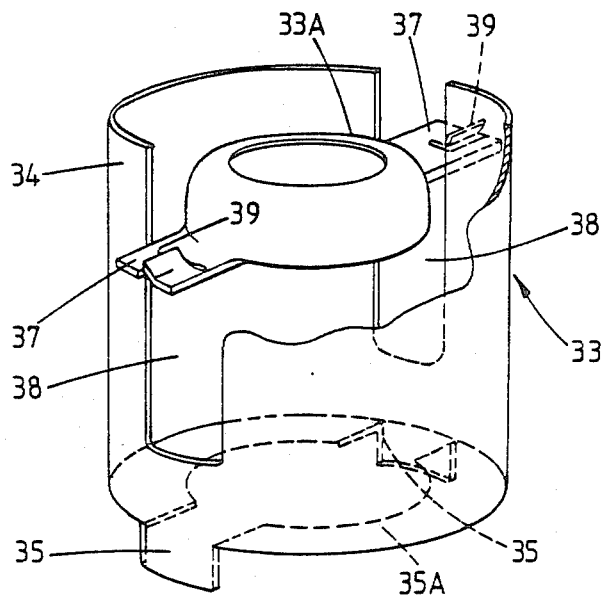
FIG. 5 is an enlarged perspective view of one form of anti-rotational device incorporated in the adjuster of FIGS. 3 and 4.

As will be seen more clearly from FIG. 5, the coupling means includes a first component 34 in the form of a hollow can made from thin gauge metal and having a pair of tongues 35 projecting from its end which will be lowermost in use. As will be seen from FIG. 3, the can is assembled around the upper end of the spigot 18 with the tongues 35 engaged closely within slots 36 formed in the upper surface of the larger diameter portion 19 of the spigot. The coupling means is thereby rendered substantially non-rotational relative to the spigot. A second component 33A of the coupling means is generally annular and, in use, surrounds the lower end portion of the manual adjuster shaft 29. A pair of arms 37 projecting radially from this component are engaged in respective longitudinal slots 38 of the first component to render the two components relatively non-rotatable but to allow relative axial movement between the two. Any other convenient number of arms may be used, as required. Each arm 37 is provided with an upstanding tongue 39 inclined to the upper surface of its associated arm and each forming a pawl for engagement with ratchet teeth 40 formed around the periphery of the lower end surface of the annular boss 28 of the end member 24, as will be seen more clearly from FIG. 4. The pawls 39 are urged firmly into engagement with the teeth 40 by a spring 40A which acts between the flange 35A of the can 34 and component 33A. The direction of the ratchet action between the pawls 39 and teeth 40 is such that rotation of the adjuster member 18 in the de-adjusting direction is normally prevented, although the adjuster member is able to rotate in the opposite direction in order to permit operation of the automatic adjuster, in the manner now to be described.

When the brake is actuated by rotation of the cam 8, the tappets 11, 12 are urged outwardly in order to urge the shoes 1 and 2 into braking engagement with the brake drum. A predetermined amount of backlash is provided between the teeth 16 and 17 respectively on the tappet head portion 15 and adjuster member or spigot 18 to permit the shoes to move outwardly sufficiently to take up the maximum desired shoe to drum clearance without causing operation of the automatic adjuster. When wear of the friction linings 4 becomes such that the shoe movement exceeds this maximum clearance, the flanks of the teeth 16 and 17 come into engagement in such a manner as to lift the spigot 18 and thereby cause the clutch 21 to be disengaged from the seat 23, permitting rotation of the spigot 18 to occur dependent upon the amount of shoe outward movement. Since the spigot is keyed to the coupling means 33 by means of the tongues 35, the coupling means rotates with the adjuster member, the second component 33A of the coupling means moving axially inwardly against the action of the spring 40A to permit the teeth 39 to move past a sufficient number of ratchet teeth 40 to accommodate such rotation. When the brake shoes move inwardly under the action of the shoe return means, the backlash between the teeth 16 and 17 is taken up in the opposite direction, permitting the clutch 21 to re-engage the seat 23, whereupon the tappet 11, 12 rotates by inter-action between said teeth in a direction such as to lengthen the adjuster strut and thereby set a new retracted position for the associated shoe.

The manual adjuster shaft 29 is normally urged in a direction away from the spigot 18 by a resilient element such as a Belleville washer 29A disposed between the rib 32 and the component 33A of the coupling means. The Belleville washer also serves to press the rib 32 firmly against the seal 31. When it is desired to effect manual de-adjustment of the associated brake shoe, the manual adjuster shaft 29 is urged axially inwardly against the action of the spring 40A to engage the socket in the inner end of the shaft 29 with the hexagonal formation 30 at the upper end of the spigot. This action will also move the second component 33A of the coupling means inwardly to disengage the pawls 39 from the ratchet teeth 40, leaving the adjuster shaft free to rotate in the de-adjustment direction by rotation of the shaft 29, which may conveniently be effected by applying a suitable tool to a further hexagonal formation 29B at the outer end of the shaft 29. When the adjuster shaft is released, the component 33A is moved under the action of the spring 40A to re-engage the pawls 39 with the teeth 40 so as once again to lock the adjuster shaft 18 against unwanted movement in the de-adjustment direction.

Figure 6:
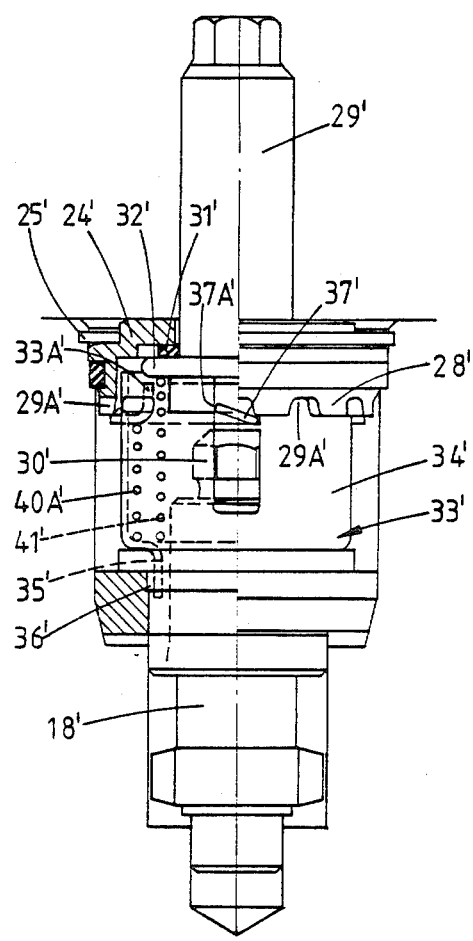
FIG. 6 is a view similar to FIG. 3 of an alternative form of the adjuster of the invention.
Figure 7:
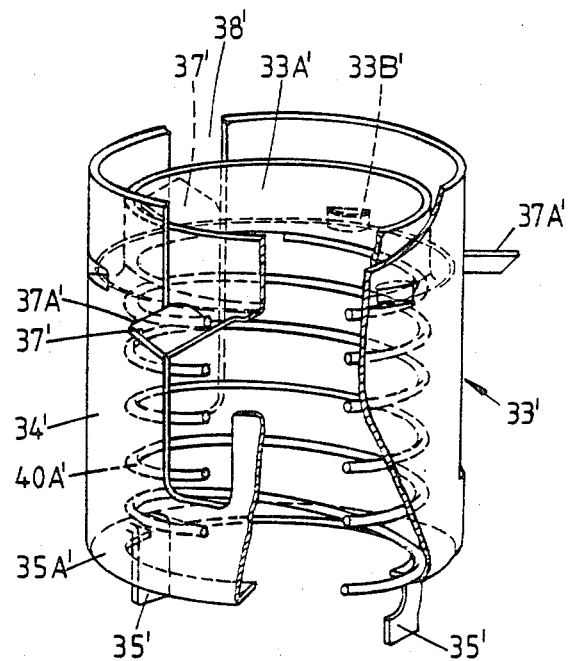
FIG. 7 is an enlarged perspective view of one form of anti-rotational device incorporated in the adjuster of FIG. 6.
Figure 8:
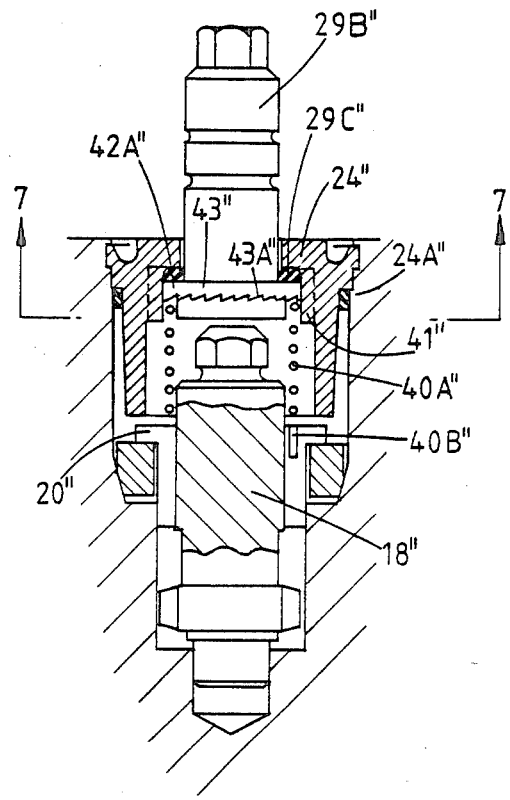
FIG. 8 is a view similar to FIG. 3 of a further alternative embodiment of the adjuster of the invention.

FIGS. 6 and 7 illustrate an alternative embodiment of the adjuster of the invention which is essentially similar to that of FIGS. 3 to 5, but includes a number of practical refinements. The uni-directional coupling means 33' is made as a self-contained unit by retaining the annular part 33A' beneath pressed projections 33B' extending inwardly of the internal wall of the can 34', the part 33A' being urged against the projections by a spring 40A' acting between that part and an inwardly directed flange 35A' of the can. The can assembly is arranged around the upper end portion of the spigot 18', as before, with tongues 35' of the can closely engaging within slots 36' of the spigot. The annular part 33A' is provided with three equi-angularly spaced arms 37' located in respective slots 38' of the can, the arms being inclined to the transverse plane of the can so that the uppermost lateral edges 37A' thereof form pawls which engage respective ones of notches 29A' formed in a flange 28' of an end closure member 24' retained axially within the housing by a circlip or similar device 25' and held against rotation in similar manner to the closure member 24 of FIG. 1. A further coil spring 41' acts between the flange 35A' of the can and a flange 32' of the spindle 29', serving to urge the spindle towards its inoperative position and also to compress a seal 31' against the end cap 24' to prevent the ingress of foreign material around the spindle.

Engagement of the pawls 37A' with the notches normally prevents unwanted rotation of the adjuster member or spigot 18' in the de-adjusting direction, whilst permitting its rotation in the opposite direction to enable automatic adjustment to be effected when required. Manual de-adjustment may be effected by means of the spindle 29' by urging the spindle axially against the action of the spring 41'. After a certain axial movement of the spindle has occurred, the flange 32' engages the top of the annular member 33A' and continued axial movement of the spindle then urges this member away from the flange 28' against the action of the spring 40A' in order to disengage the pawls from the notches 29A'. Engagement of the spindle 29' with the hexagonally shaped upper end 30 of the spigot 18' enables the latter to be turned by rotation of the spindle. When the spindle is released, the annular member 33A' is returned axially by the spring 40A' to re-engage the pawls 37A' in the notches 29A' and the spindle is returned to its axially outermost position by the spring 41'.

Figure 9:
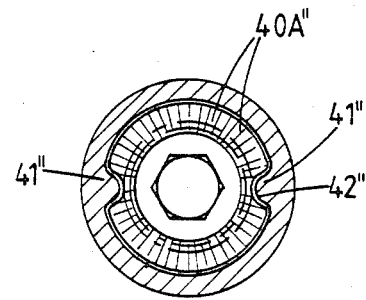
FIG. 9 is a cross-section along the line 7—7 of FIG. 8.
Figure 10:
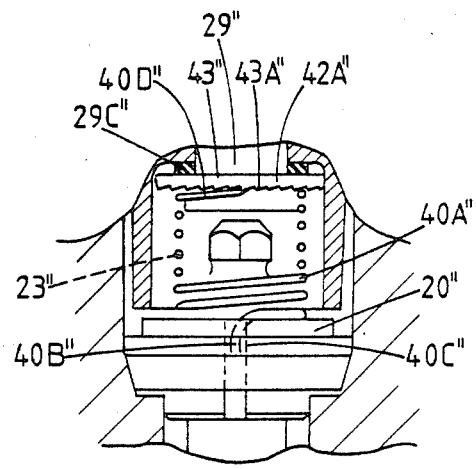
FIG. 10 is a fragmentary view rotated through 90° relative to FIG. 6.

In a further alternative embodiment illustrated in FIGS. 9 and 10, the separate two-piece coupling means 33" is dispensed with and the spring 40A" is arranged to perform the coupling function. In this embodiment, the end member 24" is snap-engaged or otherwise non-rotatably retained in the housing and is provided with a pair of inwardly projecting pips 41" over an upper portion of its axial length which engage in opposed indents 42" formed in a flange 43" of the manual adjuster shaft 29'. As an alternative to this arrangement, one or more axially extending pins carried by the end member 24" may engage in a corresponding number of slots in the flange 43". Seals 29C" and 24A" respectively prevent ingress of foreign material between the shaft 29" and end member 24" and between the latter and the housing. The shaft 29" is urged by the spring 40A" towards its position as shown in which it is disengaged from the adjuster shaft 18" and held against rotation by the pips 41". The lower end of the spring 40A" is bent downwardly to form a detent 40B" which engages in a recess 40C" formed in the flange 20" of the adjuster shaft or spigot 18". The upper end of the spring is bent to provide an inclined portion 40D" which acts as a pawl engaging one of a number of ratchet teeth 43A' formed on the underside of the flange 43' of the manual adjuster shaft 29". The spring 40A" is therefore able to act as a uni-directional coupling means between the spigot 18" and manual adjuster shaft 29", the pawl 40D" effectively preventing rotation of the spigot 18" in a de-adjusting direction by engagement with the normally non-rotatable shaft 29". Movememt of the adjuster shaft 18" in the adjusting direction is, however, permitted by the pawl 40D" deforming resiliently to ride over the ratchet teeth 43A" during operation of the automatic adjuster. Such operation is substantially as described in relation to the previous embodiment.

In an alternative arrangement, the teeth 43A" may be dispensed with and the pawl 40D" may then co-operate with a series of radial slots formed in the flange periphery.

When manual adjustment is required, the shaft 29" is urged axially inwardly against the action of the spring 40A" until the flange 43" has moved sufficiently inwardly to clear the pips 41", whereupon the shaft 29" may be rotated in the appropriate direction to effect corresponding rotation of the adjuster shaft 18 in the de-adjusting direction.

It will be seen that the invention provides a simple and effective means for preventing any tendency of the adjuster member towards random de-adjustment caused, for example, by vibration, such means being arranged so as to be readily de-activated to enable manual adjustment of the brake to be effected by means of the manual adjuster shaft 29".

We claim:

1. An automatic adjuster for a vehicle brake comprising a strut having two parts between which there is a non-reversible screw threaded connection permitting the effective length of the strut to be increased by relative rotation between the parts under the influence of an adjuster device which incorporates clutch means for controlling said relative rotation in response to the occurence of excessive clearance between braking surfaces of the brake, one of the adjuster parts being coupled by a two-part uni-directional means to a relatively fixed part of the adjuster and means urging the respective parts of the uni-directional means towards mutual engagement, for resisting rotation of said one adjuster part in a de-adjusting direction and permitting rotation thereof in the adjusting direction.

2. An adjuster according to claim 1 wherein said two parts of the uni-directional means are independently movable axially but keyed against relative rotation, one of the parts being non-rotatably engaged with said one adjuster part and the other of the parts being releasably uni-directionally coupled to said relatively fixed part.

3. An adjuster according to claim 2 wherein said one adjuster part is disposed within a bore of the housing, the bore being closed by an end member fixed against rotation and serving to mount a manual adjuster spindle for rotational and axial movement, the spindle being normally releasably keyed against rotational movement and having a formation thereon operatively engagable by said uni-directional means in order to effect said coupling against unwanted rotation of said adjuster part, the spindle formation being annular and engaged by a plurality of pawls formed on respective angularly spaced arms on said other part of the uni-directional means.

4. An adjuster according to claim 1 wherein said one adjuster part is disposed within a bore of a housing, the bore being closed by an end member fixed against rotation and serving to mount a manual adjuster spindle for rotational and axial movement, the spindle being normally releasably keyed against rotational movement and having a formation thereon operatively engagable by said uni-directional means in order to effect said coupling against unwanted rotation of said adjuster part.

5. An adjuster according to claim 4 wherein said spindle is urged by a coil spring away from its operative position, said spring forming the uni-directional means and having a first projection arranged to act as a pawl co-operating with said spindle formation and a second projection in keying engagement with said one adjuster part.

6. An adjuster according to claim 1 wherein the means which urges the parts of the uni-directional means towards mutual engagagement also urges the clutch into engagement.

7. An adjuster according to claim 1 wherein said one adjuster part is disposed within a bore of a housing, the bore being closed by an end member fixed against rotation and having thereon a formation operatively engagable by said uni-directional means.

8. An automatic adjuster for a vehicle brake comprising a strut having two parts between which there is a non-reversible screw threaded connection permitting the effective length of the strut to be increased by relative rotation between the parts under the influence of an adjuster device which incorporates clutch means for controlling said relative rotation in response to the occurence of excessive clearance between braking surfaces of the brake, one of the adjuster parts being coupled by uni-directional means to a relatively fixed part of the adjuster to resist rotation of said one adjuster part in a de-adjusting direction but to permit rotation thereof in the adjusting direction, wherein said uni-directional means comprises two parts independently movable axially but keyed against relative rotation, one of which parts is non-rotatably engaged with said one adjuster part and the other of which is releasably uni-directionally coupled to said relatively fixed part and wherein a manual adjuster spindle is movable from an inoperative position to an operative position in which it drivingly engages said one adjuster part, said other part of the uni-directional means being engagable by part of the spindle, as the latter is moved towards its operative position. so that during such movement, the spindle urges said other part to a released position in which said coupling is disengaged to permit rotation of said one adjuster part by said spindle.

9. An adjuster according to claim 8 wherein said one adjuster part is disposed within a bore of a housing, the bore being closed by an end member fixed against rotation and having thereon a formation operatively engagable by said uni-directional means in order to effect said coupling against unwanted rotation of said one adjuster part, the end member serving to mount said manual adjuster spindle for rotational and axial movement, the spindle being urged away from its operative position by spring means acting between the uni-directional device and the spindle.

10. An automatic adjuster for a vehicle brake comprising a strut having two parts between which there is a non-reversible screw threaded connection permitting the effective length of the strut to be increased by relative rotation between the parts under the influence of an adjuster device which incorporates clutch means for controlling said relative rotation in response to the occurrence of excessive clearance between braking surfaces of the brake, one of the adjuster parts being coupled by uni-directional means to a relatively fixed part of the adjuster to resist rotation of said one adjuster part in a de-adjusting direction but to permit rotation thereof in the adjusting directional, wherein said uni-direction means includ es a pawl engagable with a ratchet on said relatively fixed part.

11. An adjuster according to claim 10 wherein the ratchet is of annular form and the uni-directional means has a plurality of angularly spaced arms each carrying a pawl for engagement with the ratchet.

12. An automatic adjuster for a vehicle brake comprising a strut having two parts between which there is a non-reversible screw threaded connection permitting the effective length of the strut to be increased by relative rotation between the parts under the influence of an adjuster device which incorporates clutch means for controlling said relative rotation in response to the occurrence of excessive clearance between braking surfaces of the brake, one of the adjuster parts being coupled by uni-directional means to a relatively fixed part of the adjuster to resist rotation of said one adjuster part in a de-adjusting direction but to permit rotation thereof in the adjusting direction, wherein said uni-directional means comprises two parts independently movable axially but keyed against relative rotation, one of which parts is non-rotatably engaged with said one adjuster part and the other of which is releasably uni-directionally coupled to said relatively fixed part and wherein one of said independently movable parts is a hollow sleeve and the other is of generally annular configuration mounted within the sleeve and rotationally keyed thereto by radial arms on the annular part engaging axial slots of the sleeve, said arms forming pawls for engagement with said relatively fixed part.

13. An adjuster according to claim 12 wherein said sleeve contains a coil spring acting between the sleeve and said annular part to urge the uni-directional means into its operative condition.

14. An adjuster according to claim 13 wherein a further spring is disposed within said sleeve and urges a manual adjuster spindle away from an operative position of engagement with said one adjuster part.

15. An adjuster according to claim 13 wherein an extreme axial position of said annular part is set by abutment means on the sleeve, said abutment means acting to render said annular part captive within the sleeve.

* * * * *